(12) United States Patent
Nishimura et al.

(10) Patent No.: US 11,658,751 B2
(45) Date of Patent: May 23, 2023

(54) UNDERWATER OPTICAL WIRELESS COMMUNICATION SYSTEM, UNDERWATER OPTICAL COMMUNICATION METHOD, AND UNDERWATER MOVING BODY

(71) Applicants: SHIMADZU CORPORATION, Kyoto (JP); JAPAN AGENCY FOR MARINE-EARTH SCIENCE AND TECHNOLOGY, Yokosuka (JP)

(72) Inventors: Naoki Nishimura, Kyoto (JP); Takao Sawa, Yokosuka (JP)

(73) Assignees: Shimadzu Corporation, Kyoto (JP); JAPAN AGENCY FOR MARINE-EARTH SCIENCE AND TECHNOLOGY, Yokosuka (JP)

( * ) Notice: Subject to any disclaimer, the term of this patent is extended or adjusted under 35 U.S.C. 154(b) by 0 days.

(21) Appl. No.: 17/766,171

(22) PCT Filed: Oct. 3, 2019

(86) PCT No.: PCT/JP2019/039132
§ 371 (c)(1),
(2) Date: Apr. 1, 2022

(87) PCT Pub. No.: WO2021/064946
PCT Pub. Date: Apr. 8, 2021

(65) Prior Publication Data
US 2023/0100329 A1  Mar. 30, 2023

(51) Int. Cl.
*H04B 10/00* (2013.01)
*H04B 13/02* (2006.01)
*H04J 14/00* (2006.01)

(52) U.S. Cl.
CPC .................................. *H04B 13/02* (2013.01)

(58) Field of Classification Search
CPC ... H04B 10/11; H04B 10/112; H04B 10/1123; H04B 10/1125; H04B 10/1129;
(Continued)

(56) References Cited

U.S. PATENT DOCUMENTS

2015/0244458 A1* 8/2015 Erkmen ............. H04B 10/1125
398/122
2016/0094290 A1 3/2016 Nishino et al.
(Continued)

FOREIGN PATENT DOCUMENTS

JP   H11-243373 A   9/1999
JP   2016-178504 A  10/2016
(Continued)

OTHER PUBLICATIONS

First Office Action dated May 17, 2021 for corresponding Taiwanese Patent Application No. TW 109134219, submitted with a machine translation.
(Continued)

*Primary Examiner* — Daniel G Dobson
(74) *Attorney, Agent, or Firm* — Muir Patent Law, PLLC

(57) ABSTRACT

This underwater optical wireless communication system (100) is provided with a plurality of moving bodies (1) capable of moving underwater. The plurality of moving bodies each includes a plurality of optical wireless communication units (2) each configured to perform bidirectional communication between the plurality of moving bodies using communication light beams (30) having wavelengths different from each other in a plurality of directions which are mutually opposite directions. The plurality of optical wireless communication units is configured to perform bidirectional communication between the plurality of moving
(Continued)

bodies using communication light beams, the communication beams having the same wavelength with respect to each of the plurality of directions.

8 Claims, 9 Drawing Sheets

(58) Field of Classification Search
CPC . H04B 10/114; H04B 10/1143; H04B 10/116; H04B 10/80
See application file for complete search history.

(56) References Cited

U.S. PATENT DOCUMENTS

| | | | |
|---|---|---|---|
| 2018/0088280 A1* | 3/2018 | Kim | .................. H04B 10/1129 |
| 2018/0099733 A1 | 4/2018 | Sato et al. | |
| 2018/0122978 A1 | 5/2018 | Khatibzadeh et al. | |
| 2018/0172915 A1 | 6/2018 | Kim et al. | |

FOREIGN PATENT DOCUMENTS

| | | |
|---|---|---|
| JP | 2017-512418 A | 5/2017 |
| JP | 2017228889 A | 12/2017 |
| JP | 2018-0611160 A | 4/2018 |
| WO | 2014/181871 A1 | 11/2014 |

OTHER PUBLICATIONS

Written Opinion by the International Search Authority for PCT application No. PCT/JP2019/039132 dated Nov. 19, 2019, submitted with a machine translation.
Notice of Reasons for Refusal dated Mar. 7, 2023 for corresponding Japanese Patent Application No. JP 2021-550886.

* cited by examiner

First Modification

Second Modification

Third Modification

Fourth Modification

UNDERWATER OPTICAL WIRELESS COMMUNICATION SYSTEM, UNDERWATER OPTICAL COMMUNICATION METHOD, AND UNDERWATER MOVING BODY

TECHNICAL FIELD

The present invention relates to an underwater optical wireless communication system, an underwater optical communication method, and an underwater moving body. More specifically, it relates to an underwater optical wireless communication system, an underwater optical communication method, and an underwater moving body, for use in bidirectional communication between a plurality of moving bodies.

BACKGROUND ART

Conventionally, an underwater optical wireless communication system, an underwater optical communication method, and an underwater moving body, for use in bidirectional communication between a plurality of moving bodies, are known. Such an underwater optical wireless communication system, an underwater optical wireless communication method, and an underwater moving body are disclosed, for example, in Japanese Unexamined Patent Application Publication No. 2018-061160.

The above-described Japanese Unexamined Patent Application Publication No. 2018-061160 discloses an underwater optical wireless communication system provided with a plurality of underwater drones movable in water and a communication device for controlling the plurality of underwater drones. Further, the above-described Japanese Unexamined Patent Application Publication No. 2018-061160 discloses a configuration in which a communication device controls the plurality of underwater drones by performing optical wireless communication between an underwater drone and other underwater drones. The above-described Japanese Unexamined Patent Application Publication No. 2018-061160 discloses a configuration in which the communication device and the plurality of underwater drones perform optical wireless communication using LEDs (Light Emitting Diodes) that emit blue light.

PRIOR ART

Patent Document

Patent Document 1: Japanese Unexamined Patent Application Publication No. 2018-061160

SUMMARY OF THE INVENTION

Problems to be Solved by the Invention

In the case of performing optical wireless communication using a plurality of underwater drones (moving bodies) as in the conventional underwater optical wireless communication system described in the above-described Japanese Unexamined Patent Application Publication No. 2018-061160, the positions of the moving bodies may sometimes be changed due to disturbance, such as, e.g., a tidal current. Further, in some cases, it may be desired to change the positions of the moving bodies to arrange the plurality of moving bodies in the desired arrangement. However, in the conventional underwater optical wireless communication system described in the above-described Japanese Unexamined Patent Application Publication No. 2018-061160, it is not assumed the positional changes of the plurality of moving bodies. For this reason, communication light beam interference may occur in water, and therefore, communication may not be possible.

The present invention has been made to solve the above-described problems. It is an object of the present invention to provide an underwater optical wireless communication system, an underwater optical communication method, and an underwater moving body capable of suppressing communication light beam interference even in a case where positional relations between a plurality of moving bodies have been changed.

Means for Solving the Problems

In order to achieve the above-described object, an underwater optical wireless communication system according to the first aspect of the present invention is an underwater optical wireless communication system that performs wireless communication using light in water, the system comprising:

a plurality of moving bodies capable of moving in water, wherein the plurality of moving bodies includes an optical wireless communication unit configured to perform bidirectional communication between the plurality of moving bodies using communication light beams having wavelengths different from each other in a plurality of directions which are mutually opposite directions, and wherein the optical wireless communication unit is configured to perform bidirectional communication between the plurality of moving bodies using the communication light beams, the communication light beams having the same wavelength with respect to each of the plurality of directions, between the plurality of moving bodies.

An underwater wireless communication method according to a second aspect of the present invention is an underwater optical wireless communication method using light in water, the method comprising the steps of:

emitting communication light beams, the communication light beams having wavelengths different from each other for each irradiation direction in a plurality of directions opposite to each other, the communication light beams being the same in a wavelength with respect to each irradiation direction in the plurality of directions, between the plurality of moving bodies; and receiving the communication light beams, the communication light beams having wavelengths different from each other for each incident direction, the communication light beams being the same in a wavelength with respect to each incident direction in the plurality of directions between the plurality of moving bodies.

An underwater moving body according to a third aspect of the present invention is an underwater moving body that performs wireless communication using light in water, the underwater moving body comprising:

a light emitting unit configured to emit communication light beams having wavelengths different from each other for each irradiation direction; and a light receiving unit configured to receive the communication light beams having wavelengths different from each other for each incident direction of the communication light beam, wherein the underwater moving body is configured to be able to perform bidirectional communication with other moving bodies.

Effects of the Invention

In the underwater optical wireless communication system according to the first aspect of the present invention, as described above, the plurality of moving bodies each includes an optical wireless communication unit configured to perform bidirectional communication between the plurality of moving bodies using communication light beams having wavelengths different from each other in a plurality of directions which are mutually opposite directions, and the plurality of optical wireless communication units is configured to perform bidirectional communication between the plurality of moving bodies using communication light beams, the communication beams having the same wavelength with respect to each of the plurality of directions. With this, in each of the plurality of moving bodies, each moving body emits communication light beams having wavelengths different from each other for each irradiation direction and receives communication light beams each having a wavelength corresponding to the irradiation direction. Therefore, it is possible to suppress the interference of the communication light beams due to the difference in the wavelength from each other for each irradiation direction the communication light beam to be emitted and received. Further, between the plurality of moving bodies, the relations between the wavelengths with respect to the irradiation directions become the same. Therefore, even in a case where the positions of the moving bodies have been changed, it is possible to prevent the change in the relation between the irradiation direction of the communication light beam and the wavelength with respect to the irradiation direction. As a result, even in a case where the positional relation between the plurality of moving bodies has been changed, the interference between the communication light beams can be suppressed. Note that the "irradiation direction" denotes the direction of the communication light beam emitted from the moving body. For example, communication light beams emitted in opposite directions on the same straight line along a certain direction, such as, e.g., the vertical direction and the horizontal direction, denote communication light beams emitted in irradiation directions different from each other.

Further, in an underwater wireless communication method according to the second aspect of the present invention, the method is an underwater wireless communication method using light in water, the method comprising the steps of:

emitting communication light beams, the communication light beams having wavelengths different from each other for each irradiation direction in a plurality of directions opposite to each other, the communication light beams being the same in a wavelength with respect to each irradiation direction in the plurality of directions in the plurality of moving bodies; and receiving the communication light beams, the communication light beams having wavelengths different from each other for each incident direction, the communication light beams being the same in a wavelength with respect to each incident direction in the plurality of directions between the plurality of moving bodies.

With this, in the same manner as in the underwater optical wireless communication system according to the above-described first aspect of the present invention, even in a case where the positional relation between a plurality of moving bodies has been changed, it is possible to provide an underwater optical communication method capable of suppressing interference between communication light beams.

Further, in an underwater moving body according to the third aspect of the present invention, as described above, the underwater moving body is provided with:

a light emitting unit configured to emit communication light beams having wavelengths different from each other for each irradiation direction; and a light receiving unit configured to receive communication light beams having wavelengths differing from each other for each incident direction of the communication light beam, wherein the underwater moving body is configured to be able to perform bidirectional communication with other moving bodies.

With this, in the case of performing bidirectional communication using a plurality of communication light beams, it is possible to make the relation between the irradiation directions of communication light beams having wavelength different from each other and the wavelengths with respect to the irradiation directions can be made the same between the plurality of underwater moving bodies. As a result, in the same manner as in the underwater optical wireless communication system as recited in the first aspect of the present invention, even in a case where the positional relation between the plurality of moving bodies has been changed, it is possible to provide an underwater moving body capable of suppressing the interference between the communication light beams.

EMBODIMENTS FOR CARRYING OUT THE INVENTION

Hereinafter, some embodiments in which the present invention is embodied will be described with reference to the attached drawings.

With reference to FIGS. 1 to 5, a configuration of an underwater optical wireless communication system 100 according to one embodiment of the present invention will be described.

(Configuration of Underwater Optical Wireless Communication System)

Figure 1:
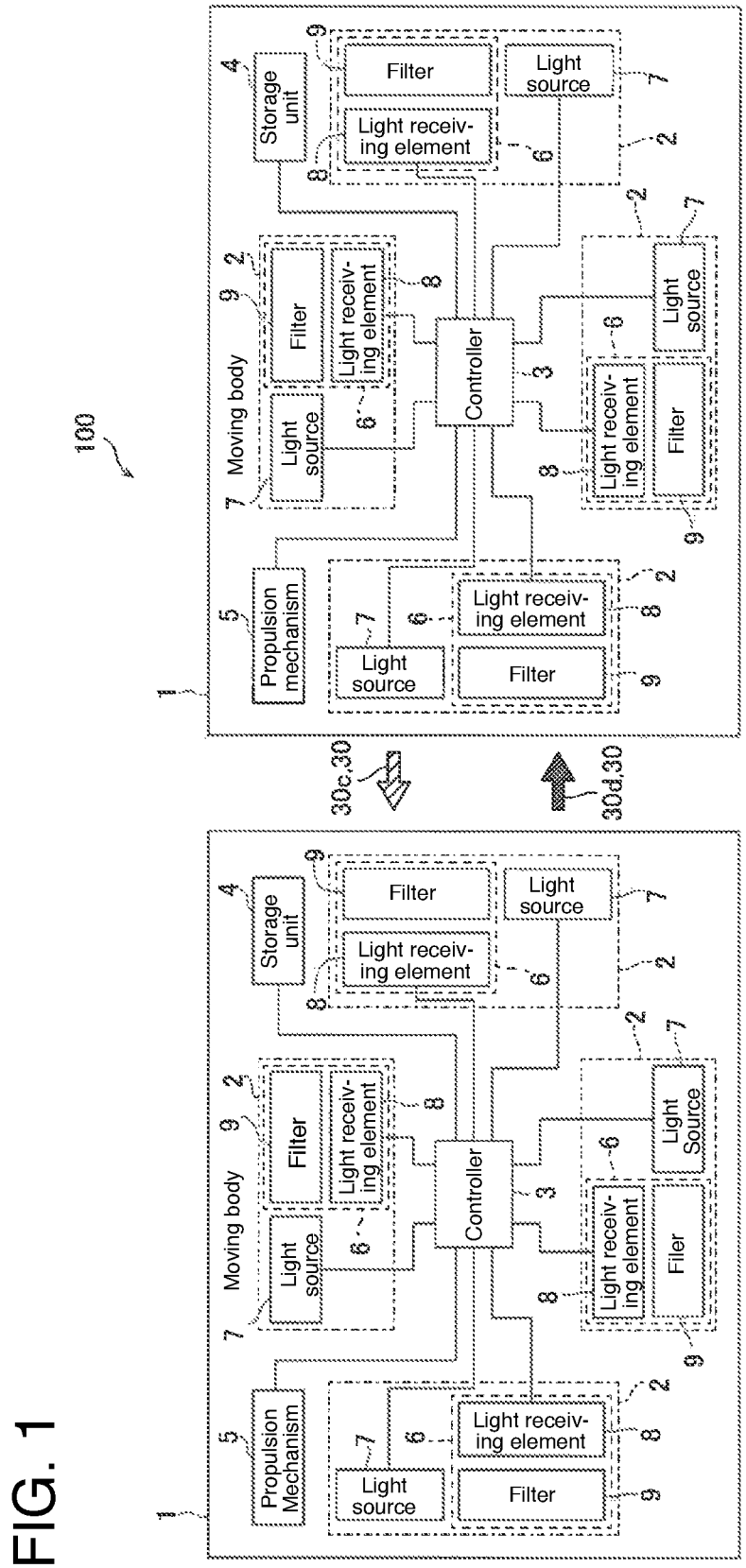
FIG. 1 is a block diagram for explaining configurations of a controller and a moving body according to one embodiment.

As shown in FIG. 1, an underwater optical wireless communication system 100 is provided with a plurality of moving bodies 1. The plurality of moving bodies 1 is configured to be movable in water. The underwater optical wireless communication system 100 in this embodiment is a system for performing wireless communication using communication light beams 30 in water. Note that the moving body 1 is one example of the "underwater moving body" recited in claims.

The moving body 1 is provided with an optical wireless communication unit 2, a controller 3, a storage unit 4, and a propulsion mechanism 5. The moving body 1 is configured to be autonomous in the sea. Further, the moving body 1 is configured to be able to perform bidirectional communication with other moving bodies 1. The moving body 1 is a so-called AUV (Autonomous Underwater Vehicle).

The optical wireless communication unit 2 is configured to perform bidirectional communication between a plurality of moving bodies 1 using communication light beams 30 having wavelengths different from each other in a plurality of directions which are mutually opposite directions. The optical wireless communication unit 2 is provided with a light emitting unit and a light receiving unit 6.

The light emitting unit is configured to emit communication light beams 30 having wavelengths different from each other for each irradiation direction of the communication light beam 30. In this embodiment, the light emitting unit has a plurality of light sources 7. The plurality of light sources 7 is each provided for each irradiation direction of the communication light beam 30 and is configured to emit communication light beams 30 each having a wavelength corresponding to the irradiation direction of the communication light beam 30. The light source 7 includes, for example, a laser diode. The light source 7 is configured to be able to emit a light beam having a wavelength of, for example, blue to green, as the communication light beam 30. Specifically, the light source 7 is configured to be able to emit a light beam having a wavelength of about 450 nm to about 570 nm, as the communication light beam 30.

The light receiving unit 6 is configured to receive communication light beams 30 having wavelengths different from each other for each incident direction of the communication light beam 30. In this embodiment, the light receiving unit 6 is provided with a plurality of light receiving elements 8. The plurality of light receiving elements 8 is each provided for each incident direction of the communication light beam 30 and is each configured to receive a communication light beam 30 having a wavelength corresponding to the incident direction of the communication light beam 30. The plurality of light receiving elements 8 each includes, for example, a photomultiplier tube or the like.

Further, in this embodiment, the light receiving unit 6 is provided with filters 9 each configured to selectively transmit a communication light beam 30 having a wavelength corresponding to each incident direction of the communication light beam 30. The filter 9 includes, for example, a band-pass filter that selectively transmits a light beam having a predetermined wavelength as a center wavelength.

The controller 3 is configured to control the moving body 1 by executing various programs stored in the storage unit 4. The controller 3 includes a processor, such as, e.g., a CPU (Central Processing Unit), and a memory, such as, e.g., a RAM (Random Access Memory) and a ROM (Read Only Memory).

The storage unit 4 stores programs to be executed by the controller 3. The storage unit 4 includes, for example, an HDD (Hard Disk Drive) or a nonvolatile memory.

The propulsion mechanism 5 is configured to give propulsion power to the moving body 1 under the control of the controller 3. The propulsion mechanism 5 includes a propeller (not illustrated) and a drive source (not illustrated) for driving the propeller. The propulsion mechanism 5 may be a so-called screw mechanism that obtains propulsion force by stroking water by rotating the propeller. Alternatively, the propulsion mechanism 5 may be a so-called water jet propulsion mechanism that obtains propulsion force by jetting a high-pressure water flow rearward.

(Configuration of Moving Body)

Figure 2:
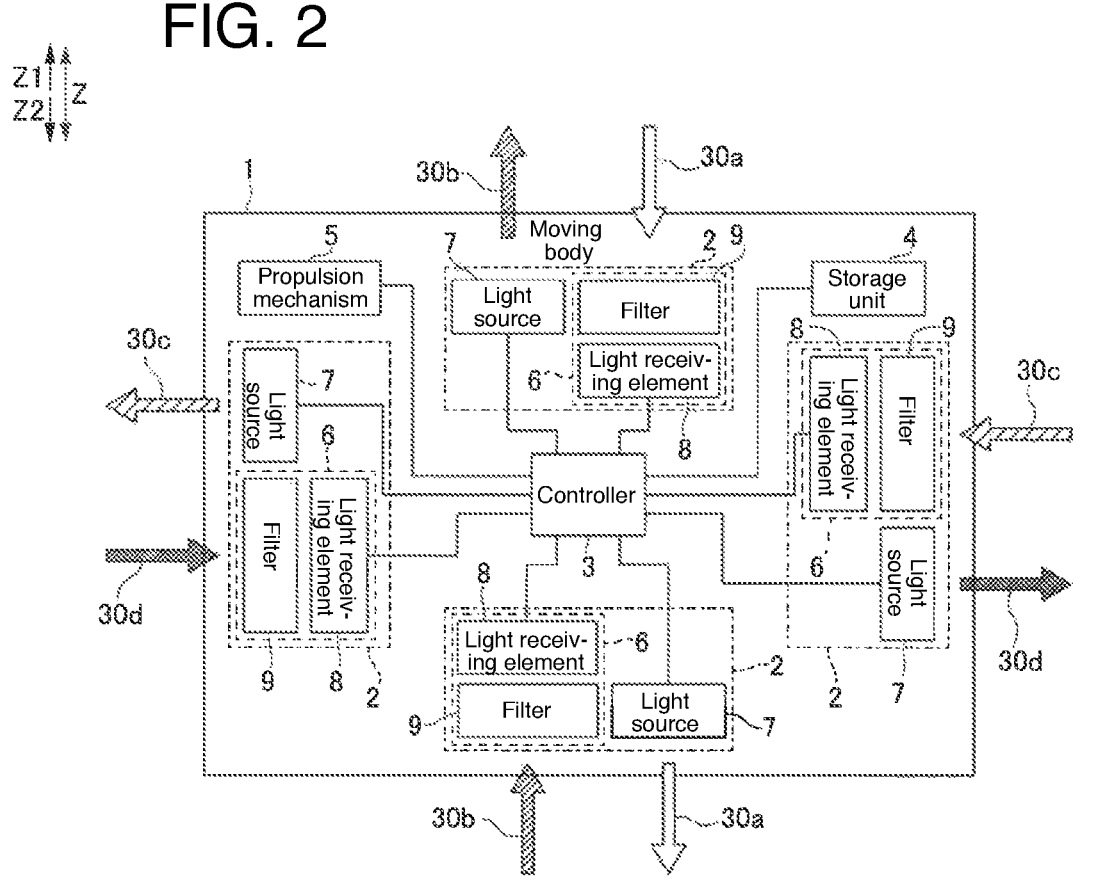
FIG. 2 is a block diagram for explaining a configuration of a moving body according to one embodiment.

Next, with reference to FIG. 2, the configuration of the moving body 1 will be described. In this specification, the traveling direction of the moving body 1 is denoted by an X1-direction. The direction opposite to the X1-direction is denoted by an X2-direction. Further, two directions orthogonal to each other in a plane orthogonal to an X-direction are denoted by a Z-direction and a Y-direction. In the example shown in FIG. 2, the vertical direction is denoted by the Z-direction. Of the Z-direction, the upper direction is denoted by a Z1-direction and the lower direction is denoted by a Z2-direction. Further, in the example shown in FIG. 2, the crosswise direction with respect to the traveling direction is denoted by a Y-direction, the right direction (the direction toward the front side of the paper surface in FIG. 2) is denoted by a Y2-direction, and the left direction is denoted by a Y1-direction (the direction toward the back of the paper surface in FIG. 2). That is, the directions in this specification denote directions determined based on the relative coordinate system with reference to the traveling direction of the moving body 1.

In this embodiment, the light source 7 is provided on the Z1-direction side and the Z2-direction side in the moving body 1. Thus, the light emitting unit is configured to be able to emit at least a communication light beam 30 in the Z1-direction and a communication light beam 30 in the Z2-direction opposite to the Z1-direction. Note that the Z1-direction and the Z2-direction are examples of the "first direction" and the "second direction" recited in claims, respectively. Further, in this embodiment, the light source 7 is also provided on the X1-direction side and the X2-direction side. Thus, the light emitting unit is configured to be able to emit communication light beams 30 in four directions, i.e., the Z1-direction, the Z2-direction, the X1-direction, and the X2-direction.

In this embodiment, the light sources 7 provided at the respective positions are configured to emit communication light beams 30 having wavelengths different from each other. Specifically, the light source 7 provided on the Z2-direction side is configured to emit a first communication light beam 30a. Further, the light source 7 provided on the Z1-direction side is configured to emit a second communication light beam 30b. Further, the light source 7 provided on the X2-direction side is configured to emit a third communication light beam 30c. Further, the light source 7 provided on the X1-direction side is configured to emit a fourth communication light beam 30d.

Further, in this embodiment, the light receiving unit 6 is provided on the Z1-direction side and the Z2-direction side in the moving body 1. Therefore, the light receiving unit 6 is configured to be able to receive at least the communication light beam 30 incident from the Z1-direction and the communication light beam 30 incident from the Z2-direction. Further, the light receiving unit 6 is provided on the X1-direction side and the X2-direction side. Therefore, the light receiving unit 6 is configured to be able to receive the communication light beam 30 incident from the X1-direction side and the communication light beam 30 incident from the X2-direction.

The first communication light beam 30a to the fourth communication light beam 30d are light beams having mutually different wavelengths within the wavelength range of blue to green. Note that the communication light beams 30 are not required to be distinguishable in color with the naked eye. It is enough that the communication light beams 30 are different in wavelength to the extent that the communication light beams can be filtered by the filters 9 for each incident direction to the light receiving unit 6. Note that, in the example shown in FIG. 2, the difference between the wavelengths of the communication light beams 30 is represented by adding different hatchings.

Each filter 9 is configured to be able to selectively transmit each communication light beam 30. That is, in the moving body 1, the filter 9 provided on the Z1-direction side is configured to selectively transmit the second communication light beam 30b. In the moving body 1, the filter 9 provided on the Z2-direction is configured to selectively transmit the first communication light beam 30a. In the moving body 1, the filter 9 provided on the X1-direction is configured to selectively transmit the third communication light beam 30c. In the moving body 1, the filter 9 provided on the X2-direction is configured to selectively transmit the fourth communication light beam 30d.

(Arrangement of a Plurality of Moving Bodies)

Next, with reference to FIG. 3, the arrangement of the plurality of moving bodies 1 in the underwater optical wireless communication system 100 according to this embodiment will be described.

Figure 3:
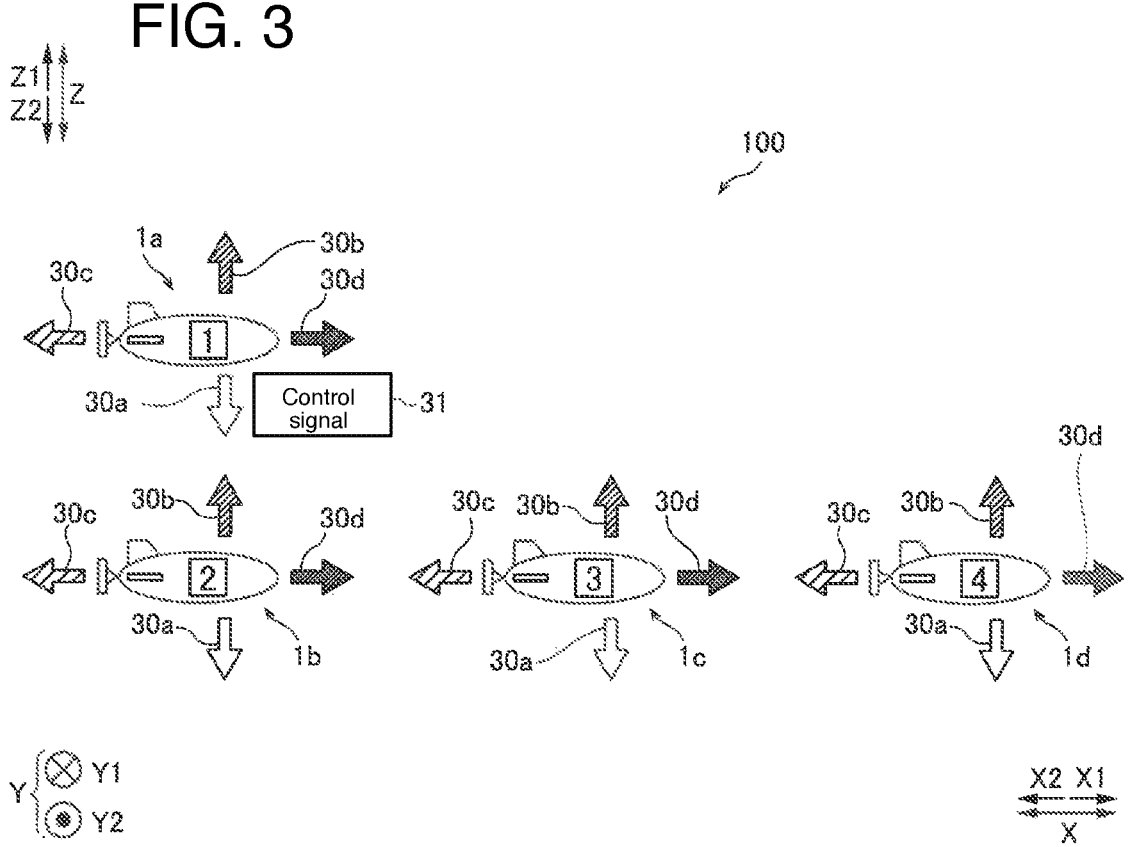
FIG. 3 is a schematic diagram showing an entire configuration of an underwater optical wireless communication system according to one embodiment.

As shown in FIG. 3, the plurality of moving bodies 1 is arranged in a predetermined arrangement in water. The example shown in FIG. 3 includes, as a plurality of moving bodies 1, a first moving body 1a, a second moving body 1b, a third moving body 1c, and a fourth moving body 1d. In the example shown in FIG. 3, the first moving body 1a and the second moving body 1b are arranged side by side in the Z-direction. Further, in the X-direction, the second moving body 1b, the third moving body 1c, and the fourth moving body 1d are arranged side by side. Note that in order to facilitate identification, marks "1" to "4" are allotted to each of the first moving body 1a to the fourth moving body 4d in each figure.

(Irradiation Direction and Wavelength of Communication Light Beam)

In the example shown in FIG. 3, the first moving body 1a to the fourth moving body 1d are configured to irradiate the second communication light beam 30b, the first communication light beam 30a, the fourth communication light beam 30d, and the third communication light beam 30c in the Z1-direction, the Z2-direction, the X1-direction, and the X2-direction, respectively.

Further, in this embodiment, the optical wireless communication unit 2 is configured to perform bidirectional communication between the plurality of moving bodies 1 by the communication light beams 30 having the same wavelength for each direction of the plurality of directions, between the plurality of moving bodies 1. Specifically, as shown in FIG. 3, the wavelength of the second communication light beam 30b in the Z1-direction is equal between the plurality of moving bodies 1. Further, the wavelength of the first communication light beam 30a in the Z2-direction is equal between the plurality of moving bodies 1. The wavelength of the fourth communication light beam 30d in the X1-direction is equal between the plurality of moving bodies 1. The wavelength of the third communication light beam 30c in the X2-direction is equal between the plurality of moving bodies 1. In other words, the bidirectional communication between the moving bodies 1 is performed by the communication light beams 30 in which the combination of the irradiation direction and the wavelength of the communication light beam 30 at the time of transmitting the communication light beam and the combination of the incident direction and the wavelength of the communication light beam 30 at the time of receiving the communication light beam are predetermined.

In this embodiment, each direction is determined based on a relative coordinate system with reference to the traveling direction of the moving body 1. Therefore, the controller 3 is configured to control the moving body 1 such that the orientations of the moving bodies 1 become the same.

(Communication Between Moving Bodies)

In this embodiment, the plurality of moving bodies 1 is configured to be able to perform direct communication between the moving bodies 1 arranged adjacently. Specifically, the direct communication can be performed between the first moving body 1a and the second moving body 1b, between the second moving body 1b and the third moving body 1c, and between the third moving body 1c and the fourth moving body 1d, using the communication light beams 30. Note that the direct communication means communication performed such that the communication light beam 30 emitted from one moving body 1 is directly incident on the other moving body 1 without being intervened by other moving bodies 1.

Further, between non-adjacent moving bodies 1, a plurality of moving bodies 1 is configured to be able to communicate with each other by a relay method in which moving bodies 1 arranged between the non-adjacent moving bodies are served as relay devices. For example, in a case where the second moving body 1b and the fourth moving body 1d communicate with each other, the third moving body 1c is served as a relay device to perform communication by a relay method.

In this embodiment, the controller 3 is configured to control the plurality of moving bodies 1. Specifically, the controller 3 is provided in each of the plurality of moving bodies 1. Each of the controllers 3 provided in the plurality of moving bodies 1 is configured to transmit a control signal 31. The controller 3 is configured to control to transmit the transmitted control signal 31 in the plurality of moving bodies 1 by the relay method. The controller 3 is configured to transmit the control signal 31 by emitting the first communication light beam 30a by the light source 7.

(Communication Between Moving Bodies after Position Replacement of Moving Bodies)

Next, with reference to FIGS. 4 to 6, the configuration for performing communication between the moving bodies 1 after the position replacement of the moving bodies 1 will be described. Specifically, a configuration will be described in which communication of a transmitted control signal 31 transmitted by a controller 3 provided in any of the plurality of moving bodies is performed by a relay method between the plurality of moving bodies 1 after the position replacement of the moving bodies.

Figure 4:
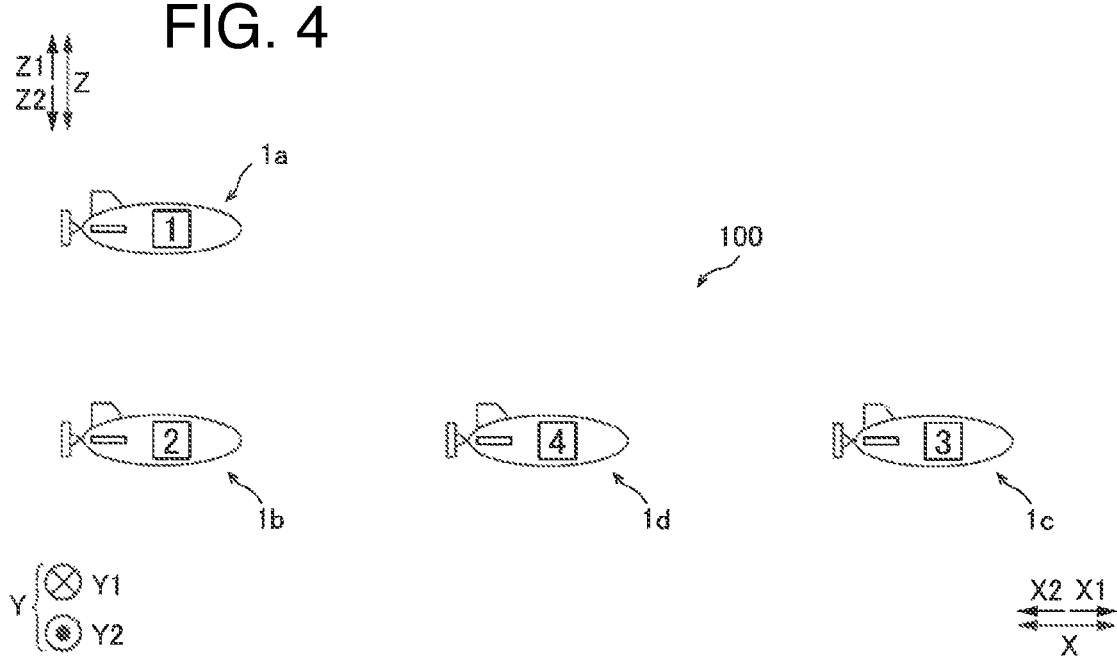
FIG. 4 is a schematic view showing a state after a position of a third moving body and a position of a fourth moving body have been changed.

As shown in FIG. 4, it is assumed that the position of the third moving body 1c and the position of the fourth moving body 1d out of the arrangement of the plurality of moving bodies 1 shown in FIG. 3 have been replaced by disturbance, such as, e.g., a tidal current.

Figure 5:
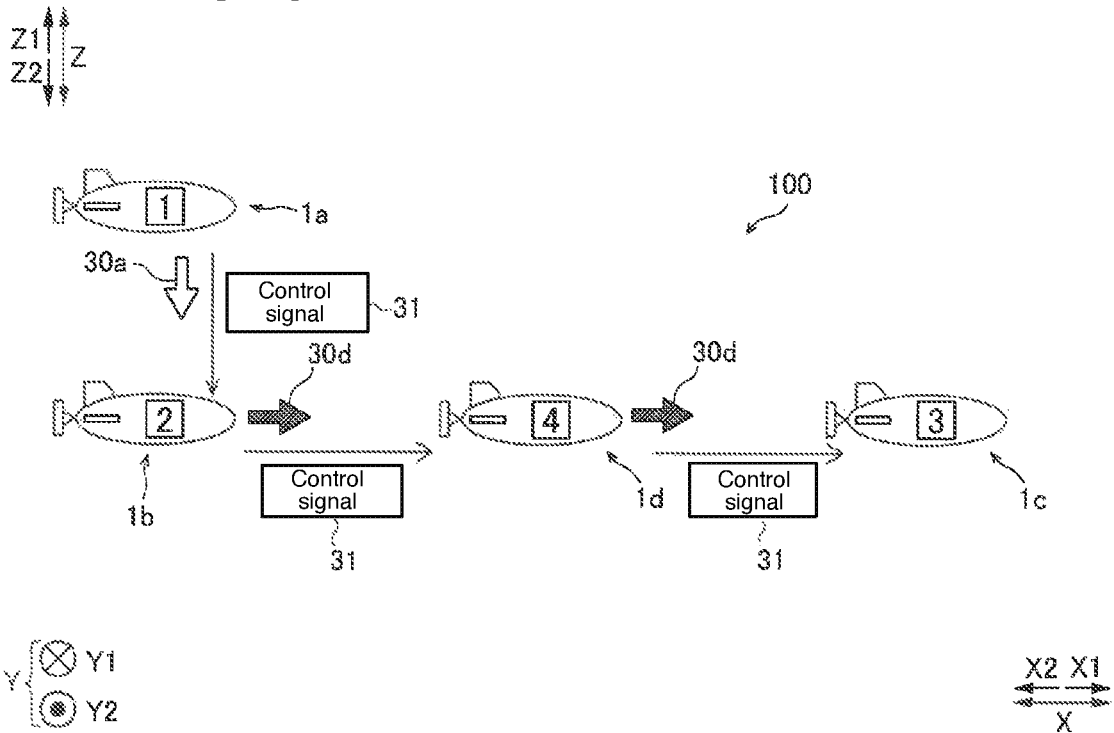
FIG. 5 is a schematic diagram for explaining a configuration in which a control signal is transmitted from a controller to a fourth moving body by a relay method.
Figure 6:
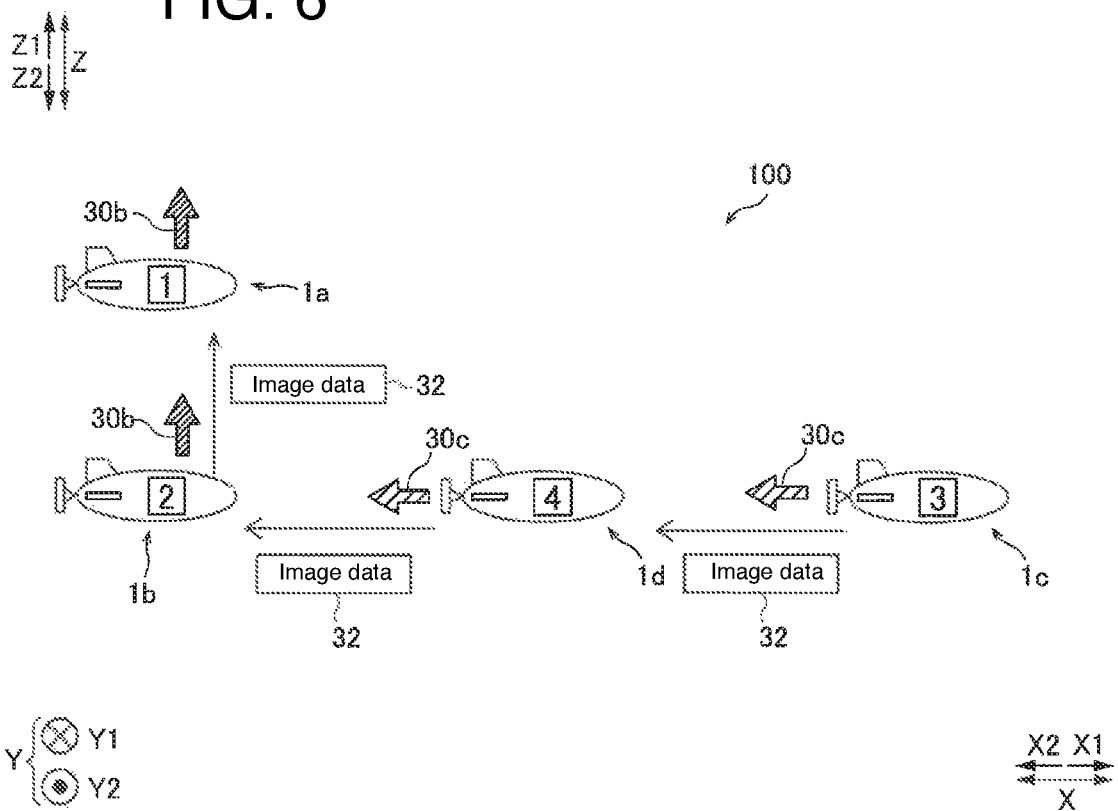
FIG. 6 is a schematic diagram for explaining a configuration in which image data is transmitted from a plurality of moving bodies to a controller.

In the example shown in FIG. 5, the control signal 31 transmitted from the controller 3 provided in the first moving body 1a is transmitted to other moving bodies 1. The first moving body 1a transmits the control signal 31 to the second moving body 1b by emitting a first communication light beam 30a to the second moving body 1b. The second moving body 1b that has received the control signal 31 emits a fourth communication light beam 30d to the fourth moving body 1d. With this, the control signal 31 is transmitted from the second moving body 1b to the fourth moving body 1d. That is, the controller 3 is configured to transmit the control signal 31 via the first communication light beam 30a.

Further, the fourth moving body 1d that has received the control signal 31 from the second moving body 1b emits a fourth communication light beam 30d to the third moving body 1c. With this, the control signal 31 is transmitted from the fourth moving body 1d to the third moving body 1c.

The wavelengths of the communication light beams 30 with respect to the irradiation direction are equal to each other. Therefore, even in a case where the position of the third moving body 1c and the position of the fourth moving body 1d have been replaced, the underwater optical wireless communication system 100 can maintain the communication. Note that "the underwater optical wireless communication system 100 can maintain the communication" means that even if the communication is interrupted during the movements of the moving bodies 1, the communication is automatically established after completion of the movements.

(Data Transmission Processing)

Next, with reference to FIG. 6, a configuration will be described in which data communication is performed between a plurality of moving bodies 1 in a state in which the third moving body 1c and the fourth moving body 1d have been replaced from the state shown in FIG. 3. Specifically, a configuration will be described in which the image data 32 acquired by the third moving body 1c is transmitted to the first moving body 1a by communication of a relay-type method between a plurality of moving bodies 1. Note that the image data 32 is data, such as, e.g., a moving image in the sea acquired by an imaging unit (not illustrated) provided to the moving body 1.

The third moving body 1c that has acquired the image data 32 transmits the image data 32 to the fourth moving body 1d by emitting the third communication light beam 30c to the fourth moving body 1d. The fourth moving body 1d that has received the image data 32 transmits the image data 32 to the second moving body 1b by emitting the third communication light beam 30c to the second moving body 1b.

The second moving body 1b that has received the image data 32 transmits the image data 32 to the first moving body 1a by emitting the second communication light beam 30b to the first moving body 1a. With this, the image data 32 is transmitted from the third moving body 1c to the first moving body 1a.

Figure 7:
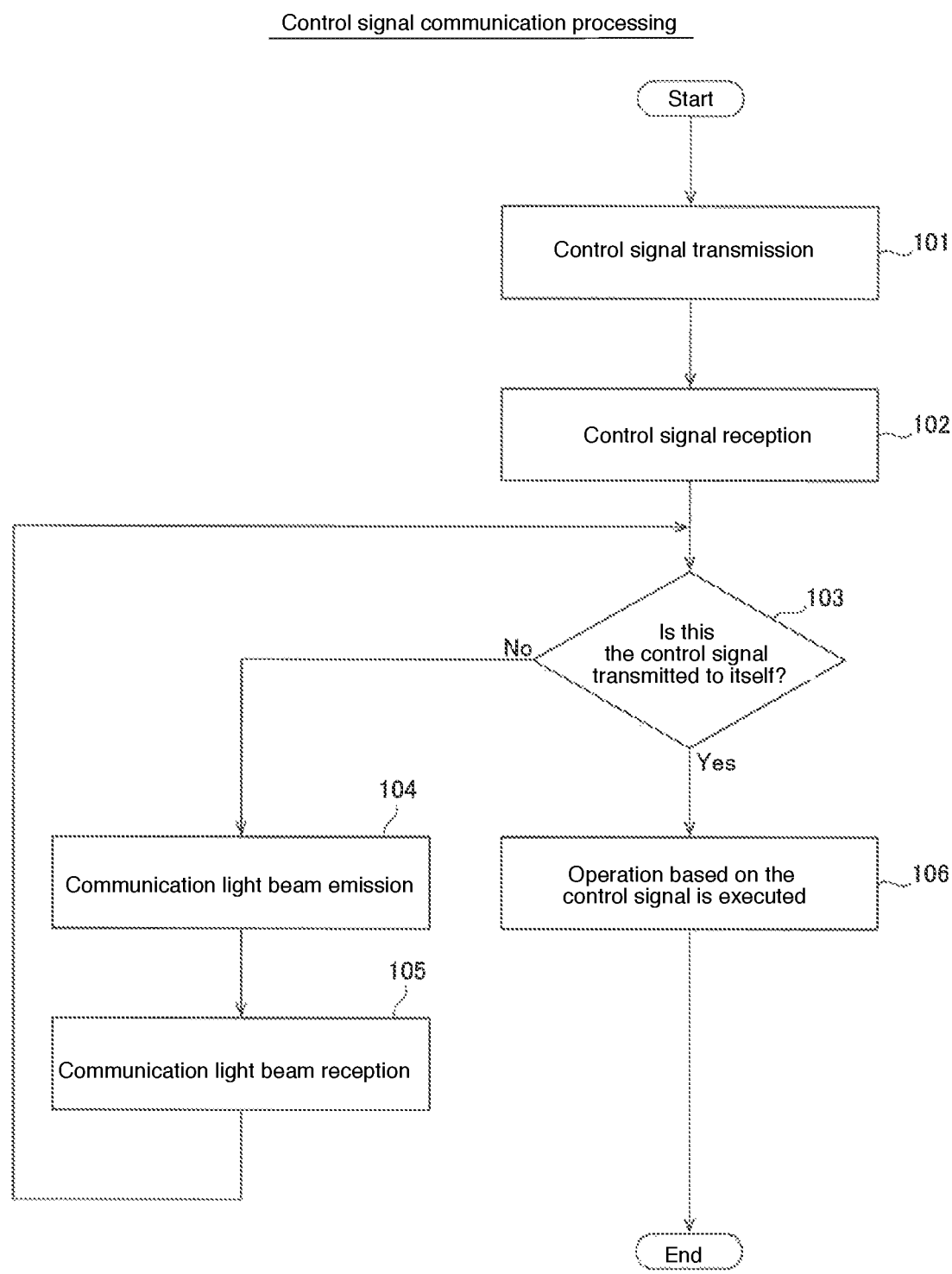
FIG. 7 is a flowchart for explaining moving body position replacement processing according to one embodiment.

Next, with reference to FIG. 7, the control signal communication processing between the moving bodies 1 in the underwater optical wireless communication system 100 according to this embodiment will be described.

In Step 101, the first communication light beam 30a is emitted from the light source 7, so that the control signal 31 is transmitted from one moving body 1 to the other moving body 1. In this embodiment, the first moving body 1a transmits the control signal 31 to the second moving body 1b.

In Step 102, the light receiving unit 6 receives the control signal 31 by receiving the first communication light beam 30a. In this embodiment, the second moving body 1b receives the control signal 31.

In Step 103, the controller 3 determines whether or not the control signal 31 is a signal transmitted to itself. Specifically, each moving body 1 is assigned by a unique ID number. The control signal 31 includes the ID number of the moving body 1 together with a control command. Therefore, each moving body 1 can determine whether or not the control signal 31 is a signal transmitted to itself based on the identification number included in the control signal 31. In a case where it is not a control signal 31 sent to itself, the processing proceeds to Step 104. In a case where it is a control signal 31 sent to itself, the processing proceeds to Step 106.

In Step 104, the light emitting unit performs control to transmit a control signal 31 by emitting a communication light beam 30. Specifically, the controller 3 emits the communication light beam 30 by controlling the light source 7. The controller 3 performs control to transmit the control signal 31 by emitting the communication light beam 30.

In Step 105, the light receiving unit 6 receives the communication light beam 30 to perform control to receive the control signal 31. Specifically, the light receiving unit 6 receives the communication light beam 30. Upon receipt of the communication light beam 30, the control signal 31 is transmitted between the plurality of moving bodies 1. Thereafter, processing proceeds to Step 103. The processing of Step 103 to Step 105 is repeated until the control signal 31 is transmitted to the moving body 1 to be controlled.

In Step 106, the controller 3 causes the moving body 1 to perform a predetermined operation based on the information included in the control signal 31. For example, the controller 3 performs control to move the moving body 1 by controlling the propulsion mechanism 5. Thereafter, the processing ends.

Figure 8:
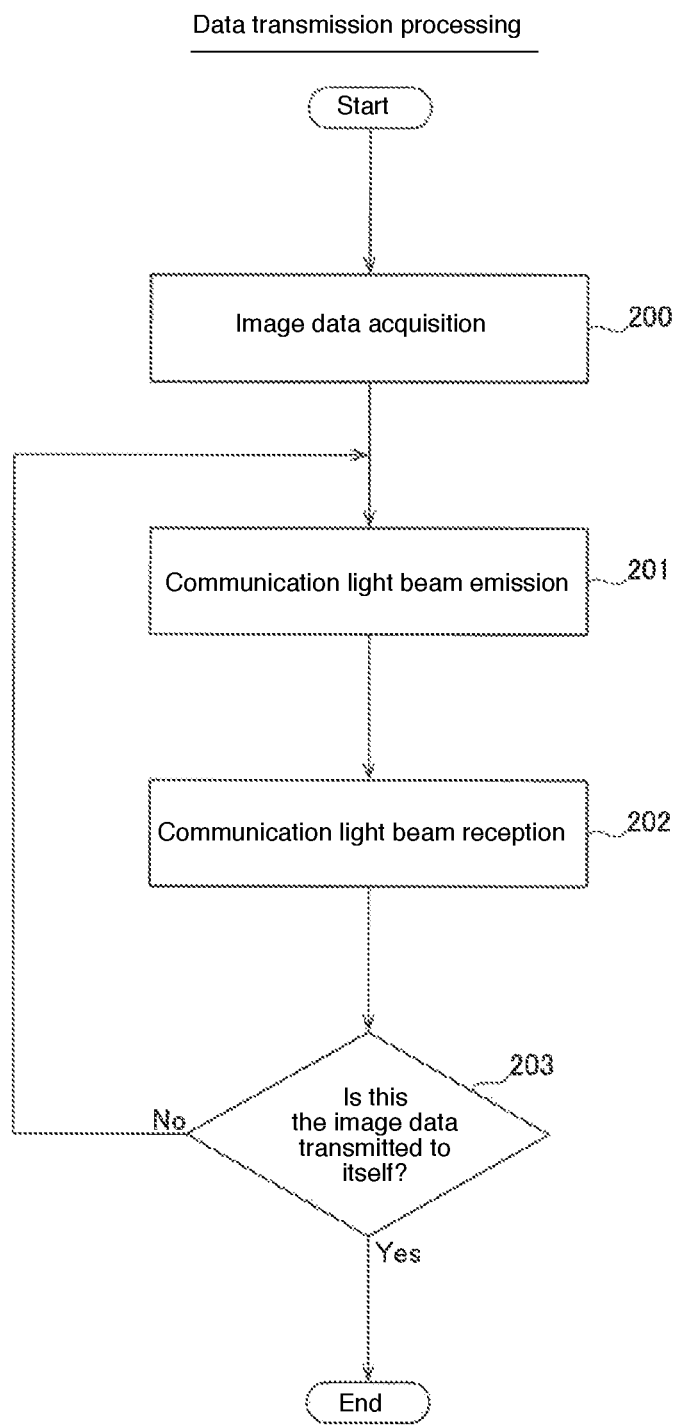
FIG. 8 is a flowchart for explaining data transmission processing between a plurality of moving bodies according to one embodiment.

Next, with reference to FIG. 8, the processing in which the underwater optical wireless communication system 100 transmits the image data 32 will be described.

In Step 200, the moving body 1 acquires the image data 32. Note that in this embodiment, the third moving body 1c acquires the image data 32.

In Step 201, the light emitting unit emits communication light beams 30 having wavelengths different for each irradiation direction in a plurality of directions that are mutually different directions, the wavelength for each irradiation direction in the plurality of directions being equal between the plurality of moving bodies 1. Specifically, the controller 3 emits a communication light beam 30 by controlling the light source 7. The controller 3 transmits the image data 32 by emitting the communication light beam 30.

In Step 202, the light receiving unit 6 receives a communication light beam 30 having a wavelength different for each incident direction and the same with respect to the incident direction of the plurality of directions between the plurality of moving bodies 1. Specifically, the light receiving unit 6 acquires the image data 32 by receiving the communication light beam 30.

In Step 203, the controller 3 determines whether or not the image data 32 has been received from another moving body 1. In a case where the controller 3 has determined that the image data 32 has not been received, the processing proceeds to Step 201. In a case where the controller 3 has determined that the image data 32 has been received, the processing ends. That is, the processing of Step 201 to Step 203 are repeated until the image data 32 has been transmitted from the third moving body 1c to the first moving body 1a by the relay method.

[Effects of this Embodiment]

In this embodiment, the following effects can be obtained.

In this embodiment, as described above, the underwater optical wireless communication system 100 is an underwater optical wireless communication system for performing wireless communication using light in water. The underwater optical wireless communication system is provided with the plurality of moving bodies 1 movable in water. The plurality of moving bodies 1 each includes the optical wireless communication unit 2 for performing bidirectional communication between the plurality of moving bodies 1 using communication light beams 30 having wavelengths mutually different from each other in the plurality of directions mutually opposite to each other. The optical wireless communication unit 2 is configured to perform bidirectional communication between the plurality of moving bodies 1 by communication light beams 30 having wavelengths equal for each direction of the plurality of directions. With this, each of the moving bodies 1 emits the communication light beams 30 having a wavelength different for each irradiation direction, and receives the communication light beams 30 each having the wavelength corresponding to the irradiation direction. Therefore, it is possible to suppress the interference between the communication light beams 30 due to the difference in the wavelength for each irradiation direction of the communication light beam 30 to be emitted and received. Further, between the plurality of moving bodies 1, the relation between the wavelengths with respect to the irradiation directions becomes the same. Therefore, even in a case where the positions of the moving bodies 1 have been changed, it is possible to prevent the change in the relation between the irradiation direction of the communication light beam 30 and the wavelength with respect to the irradiation direction. As a result, even in a case where the positional relation between the plurality of moving bodies 1 has been changed, it is possible to suppress the interference between the communication light beams 30.

Further, in this embodiment, as described above, the optical wireless communication unit 2 is provided with: a light emitting unit for emitting communication light beams 30 having wavelengths different from each other for each irradiation direction of the communication light beam 30; and a light receiving unit 6 for receiving communication light beams 30 having wavelengths different from each other for each incident direction of the communication light beam 30. The light emitting unit is configured to emit communication light beams 30 at least in a first direction and in a second direction opposite to the first direction. The light receiving unit 6 is configured to be able to receive the communication light beam 30 incident from the first direction and the communication light beam 30 incident from the second direction. The wavelengths of the communication light beams 30 with respect to the first direction are equal between the plurality of moving bodies 1. The wavelengths of the communication light beams 30 with respect to the second direction are equal between the plurality of moving bodies 1. With this, even in a case where the positions of the moving bodies 1 adjacently arranged in the first direction or the second direction have been replaced, the relation of the wavelength of the communication light beam 30 with respect to the first direction and the relation of the wavelength of the communication light beam 30 with respect to the second direction are maintained. As a result, even in a case where the positions of the moving bodies 1 adjacently arranged in the first direction or the second direction have been replaced, it is possible to maintain the communication between the plurality of moving bodies 1 while suppressing the interference between the communication light beams 30.

Further, in this embodiment, as described above, the light emitting unit is provided with a plurality of light sources 7 for each irradiation direction of the communication light beam 30 and configured to emit a communication light beam 30 having a wavelength corresponding to the irradiation direction. The light receiving unit 6 is provided with a plurality of light receiving elements 8 provided for each incident direction of the communication light beam 30 and configured to receive the communication light beam 30 having a wavelength corresponding to the incident direction of the communication light beam 30. With this, it is possible to arrange the light sources 7 configured to be able to emit communication light beams 30 having wavelengths different from each other for each irradiation direction of the communication light beam 30. Consequently, for example, it is possible to suppress the control from becoming complex, as compared with the configuration in which communication light beams 30 are emitted in a plurality of directions while changing the wavelength and the irradiation direction of a communication light beam 30 emitted from a single light source 7. Further, it is possible to arrange light receiving elements 8 capable of receiving communication light beams 30 having wavelengths different from each other in each receiving direction of a communication light beam 30. Consequently, for example, as compared with the configuration of switching filters for each incident direction and wavelength of a communication light beam 30 incident on a single light receiving element 8, it is possible to suppress the complication of the control.

Further, in this embodiment, as described above, the light receiving unit 6 is provided with the filter 9 that selectively transmits the communication light beam 30 having a wavelength corresponding to each incident direction of the communication light beam 30. With this, even in a case where a communication light beam 30 that does not correspond to the incident direction of the communication light beam 30 is incident on the light receiving unit 6, it is possible to easily remove the communication light beam 30 by the filter 9. Consequently, it is possible to suppress the incident of the communication light beam 30 that does not correspond to the incident direction to the receiving element 8, and therefore, it is possible to easily suppress the interference between communication light beams 30.

Further, in this embodiment, as described above, the plurality of moving bodies 1 is configured to be able to perform direct communication between the moving bodies 1 arranged adjacently. Further, the plurality of moving bodies 1 is configured to be able to perform communication between the moving bodies 1 that are not arranged adjacently, by a relay system in which a plurality of moving bodies arranged between the moving bodies not arranged adjacently is served as relay devices. With this, when communicating between a plurality of moving bodies 1, it is possible to perform communication directly or by a relay method, based on the positions of the moving bodies 1. As a result, in the case of arranging a plurality of moving bodies 1 in a desired sequence, it is possible to reduce the constrains in the arrangement of the moving bodies 1.

Further, in this embodiment, as described above, it is further provided with the controller 3 for controlling a plurality of moving bodies 1. The controller 3 is configured to transmit a control signal 31 and perform control to transmit the transmitted control signal 31 by a relay method in the plurality of moving bodies 1. With this, by transmitting the control signal 31 by a relay method between three or more moving bodies 1, even in a case where, for example, the moving bodies 1 are arranged at positions where the intensity of the communication light beam 30 is attenuated below the communicable strength due to a large distance between the plurality of moving bodies 1, it is possible to transmit the control signal 31. As a result, the constrains of the arrangement of the moving bodies 1 can be reduced, which in turn can improve the convenience of the user.

Further, in this embodiment, as described above, the underwater optical communication method is an underwater optical communication method for performing wireless communication using light in water. The underwater wireless communication method includes the steps of:

emitting communication light beams, the communication light beams 30 having wavelengths different from each other for each irradiation direction in a plurality of directions opposite to each other, the communication light beams 1 being the same in a wavelength with respect to each irradiation direction in the plurality of directions in the plurality of moving bodies 1; and receiving the communication light beams, the communication light beams having wavelengths different from each other for each incident direction, the communication light beams being the same in a wavelength with respect to each incident direction in the plurality of directions between the plurality of moving bodies.

With this, in the same manner as in the above-described underwater optical wireless communication system 100, even in a case where the positional relation between the plurality of moving bodies 1 has been changed, it is possible to provide an underwater optical wireless communication method capable of suppressing the interference between the communication light beams 30.

Further, in this embodiment, as described above, the moving body 1 is an underwater moving body (moving body 1) for performing wireless communication using light in water. The moving body 1 is provided with a light emitting unit that emits communication light beams 30 having wavelengths different from each other for each irradiation direction and is configured to be able to perform bidirectional communication with the other moving bodies 1. With this, in the case of performing bidirectional communication using a plurality of underwater moving bodies (moving bodies 1), it is possible to make the relation between the irradiation directions of the communication light beams 30 that differ in the wavelength with each other and the wavelength with respect to the irradiation direction the same. As a result, in the same manner as in the above-described underwater optical wireless communication system 100, even in a case where the positional relation between a plurality of moving bodies 1 has been changed, it is possible to provide an underwater optical communication method capable of suppressing the interference between communication light beams 30.

[Modifications]

It should be understood that the embodiments disclosed here are examples in all respects and are not restrictive. The scope of the present invention is shown by claims rather than the descriptions of the embodiments described above, and includes all changes (modifications) within the meaning and the range equivalent to the claims.

(First Modification)

Figure 9:
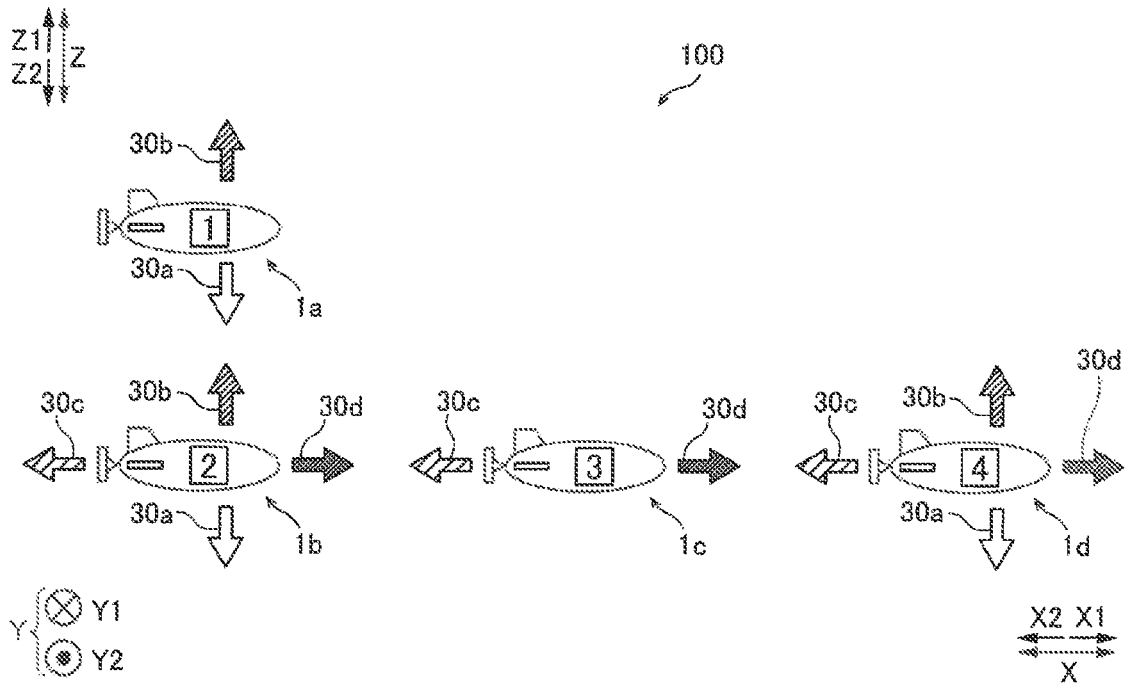
FIG. 9 is a schematic diagram showing a configuration of an underwater optical wireless communication system according to a first modification.

For example, in the above-described embodiment, a configuration is shown in which all of the moving bodies 1 include the moving body 1 configured to emit communication light beams 30 in the Z-direction and X-direction, but the present invention is not limited thereto. For example, as shown in FIG. 9, it is not required that all of the moving bodies 1 are configured to be able to emit communication light beams 30 in the same directions. Specifically, as shown in FIG. 9, the first moving body 1*a* may be configured to be able to emit the second communication light beam 30*b* and the first communication light beam 30*a* in the Z1-direction and the Z2-direction, respectively, and configured so as not to be able to emit communication light beams in the X-direction and the Y-direction. Further, the second moving body 1*b* may be configured to be able to emit the second communication light beam 30*b*, the first communication light beam 30*a*, the fourth communication light beam 30*d*, and the third communication light beam 30*c* in the Z1-direction, the Z2-direction, the X1-direction, and the X2-direction, respectively. Further, the third moving body 1*c* is configured to be able to emit the fourth communication light beam 30*d* and the third communication light beam 30*c* in the X1-direction and the X2-direction, respectively, and configured so as not to be able to emit communication light beams 30 in the Z-direction and the Y-direction. Further, the fourth moving body 1*d* is configured to emit the second communication light beam 30*b*, the first communication light beam 30*a*, the fourth communication light beam 30*d*, and the third communication light beam 30*c* in the Z1-direction, the Z2-direction, the X1-direction, and the X2-direction, respectively.

(Second Modification)

Figure 10:
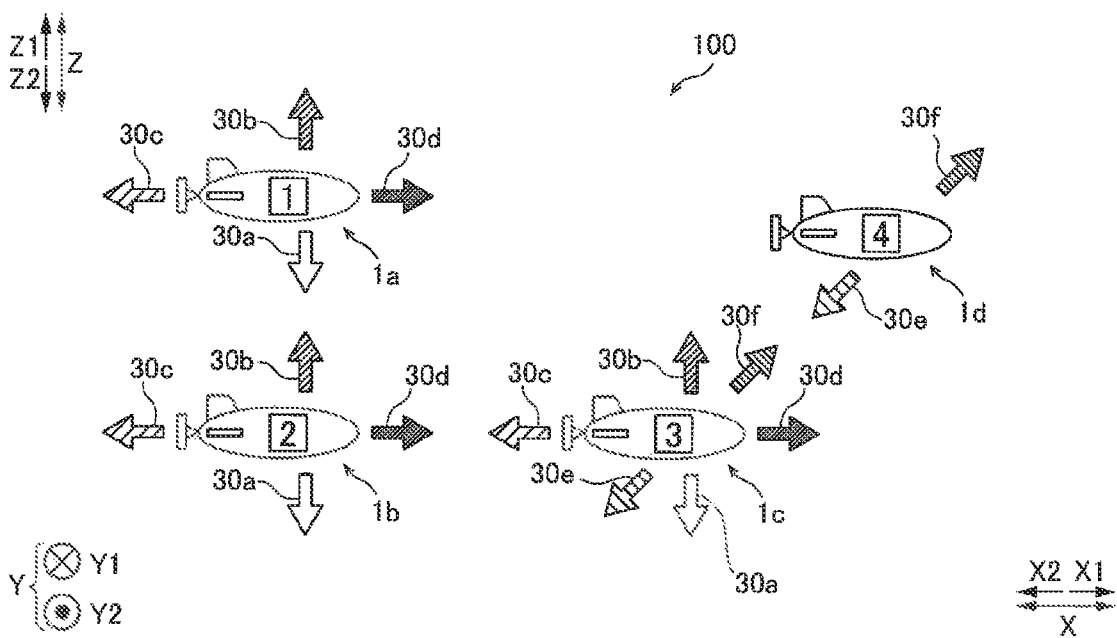
FIG. 10 is a schematic diagram showing a configuration of an underwater optical wireless communication system according to a second modification.

Further, in the above-described embodiment, an example is shown in which it is configured such that a plurality of moving bodies 1 each emits communication light beams 30 in the Z-direction and the X-direction, but the present invention is not limited thereto. For example, as shown in FIG. 10, the moving body 1 may be configured to emit communication light beams 30 obliquely. In the example shown in FIG. 10, the moving body 1 is configured to be able to emit a fifth communication light beam 30*e* and a sixth communication light beam 30*f* in the oblique direction. By configuring as described above, it is possible to replace the positions of the moving bodies 1 that emit the communication light beams 30 (the fifth communication light beam 30*e* and the sixth communication light beam 30*f*) obliquely. As a result, it is possible to further improve the degree of freedom of the arrangement of the plurality of moving bodies 1.

(Third Modification)

Figure 11:
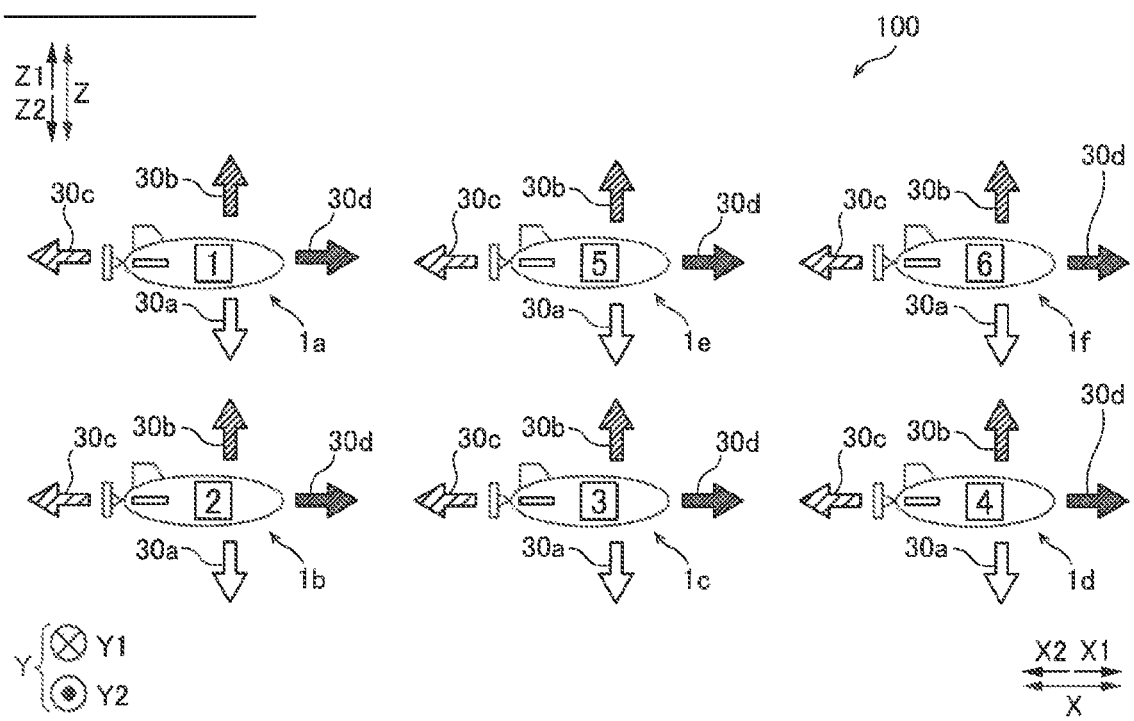
FIG. 11 is a schematic diagram for explaining an arrangement of a plurality of moving bodies according to a third modification.

Further, in the above-described embodiments, an example is shown in which the plurality of moving bodies 1 is linearly arranged in the Z-direction and the X-direction, but the present invention is not limited thereto. For example, as shown in FIG. 11, a plurality of moving bodies 1 may include, as a plurality of moving bodies 1, a first moving body 1*a*, a second moving body 1*b*, a third moving body 1*c*, a fourth moving body 1*d*, a fifth moving body 1*e*, and a sixth moving body if arranged in a matrix in the Z-direction and the X-direction. In a case where a plurality of moving bodies 1 is arranged in a matrix, a plurality of paths exists when transmitting the control signal 31 or the image data 32. Therefore, the controller 3 may be configured to preset the path for transmitting the control signal 31 or the image data 32 to transmit the control signal 31 or the image data 32 by the moving bodies 1 arranged in the predetermined path.

(Fourth Modification)

Figure 12:
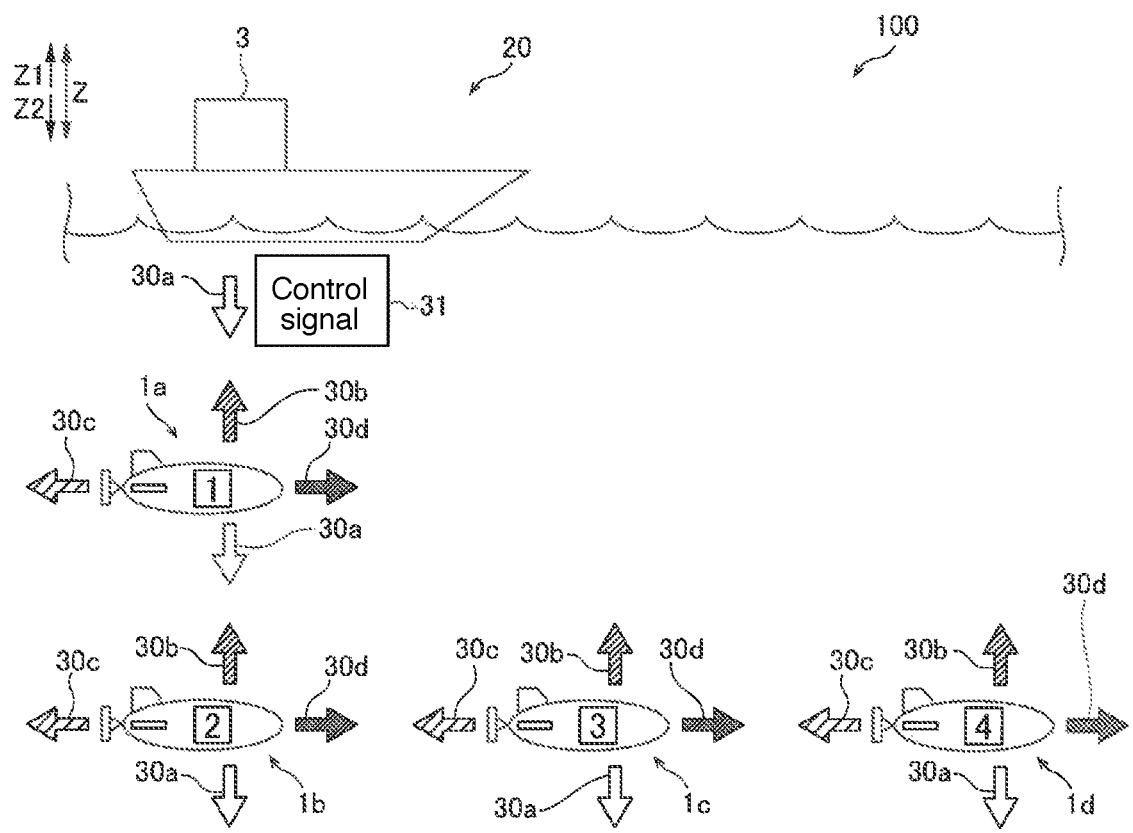
FIG. 12 is a schematic diagram showing a configuration of an underwater optical wireless communication system according to a fourth modification.

Further, in the above-described embodiments, an example is shown in which it is configured such that the controller 3 provided in any one of the plurality of moving bodies 1 transmits the control signal 31, but the present invention is not limited thereto. For example, as in a fourth modification shown in FIG. 12, the controller 3 provided on the vessel 20 may be configured to transmit the control signal 31 to the moving body 1. In the example shown in FIG. 12, the controller 3 provided on the vessel 20 is configured to transmit the first control signal 31 to the first moving body 1a, but may be configured to transmit the control signal 31 from the controller 3 to a plurality of moving bodies 1.

(Other Modifications)

Further, in the above-described embodiment, an example is shown in which it is configured such that the light emitting unit is provided with a plurality of light sources 7 and the light receiving unit 6 is provided with a plurality of light receiving elements 8, but the present invention is not limited thereto. For example, the light emitting unit may be configured to include a single light source 7. Further, the light receiving unit 6 may be configured to include a single light receiving element 8. In a case where the light emitting unit is configured to include a single light source 7, it is sufficient to change the wavelength of the communication light beam 30 for each irradiation direction of the communication light beam 30. Further, in a case where the light receiving unit 6 is configured to include a single light receiving element 8, it is sufficient to change the wavelength that the filter 9 selectively transmits for each receiving direction of the communication light beam 30.

Further, in the above-described embodiment, an example is shown in which it is configured such that as the plurality of moving bodies 1, four moving bodies 1, i.e., the first moving body 1a to the fourth moving body 1d, are exemplified, but the present invention is not limited thereto. For example, as long as two or more moving bodies 1 are provided as the plurality of moving bodies 1, the number of moving bodies 1 may be any number.

Further, in the above-described embodiments, an example is shown in which it is configured such that the moving body 1 emits communication light beams 30 in the four directions, i.e., the Z1-direction, the Z2-direction, the X1-direction, and the X2-direction, but the present invention is not limited thereto. For example, the moving body 1 may be configured to emit communication light beams 30 in six directions, i.e., the Z1-direction, the Z2-direction, the X1-direction, the X2-direction, the Y1-direction, and the Y2-direction.

Further, in the above-described embodiments, the relation between the direction and the wavelength of the communication light beam 30 to be emitted and received by the moving body 1 is set by a relative coordinate system based on the traveling direction of the moving body 1, but the present invention is not limited thereto. For example, the relation between the direction and the wavelength of the communication light beam 30 to be emitted and received by the moving body 1 may be set by an absolute coordinate system. Specifically, the vertical direction may be defined as a Z-direction, and two directions perpendicular to each other in a plane perpendicular to the Z-direction may be defined as an X-direction and a Y-direction.

In the case of setting the relation between the direction and the wavelength of the communication light beam 30 to be emitted and received by the moving body 1 by the absolute coordinate system, when the direction of the moving body 1 is changed, the relation between the wavelength and the irradiation direction of the communication light beam 30 and the relation between the wavelength and the light receiving direction of the communication light beam 30 change. Therefore, when the direction is changed, each moving body 1 may be configured to change the wavelength of the communication light beam 30 emitted from each light emitting unit in accordance with the irradiation direction. Further, the light receiving unit 6 may be configured to change the wavelength that the filter 9 transmits in accordance with the light receiving direction or replace the filter 9 with a filter that corresponds to the light receiving direction of the communication light beam 30. However, in a case where the relation between the direction and the wavelength of the communication light beam 30 that the moving body 1 emits and receives is set by the absolute coordinate system, the control of the light emitting unit and the light receiving unit 6 becomes complicated. Therefore, the relation between the direction and the wavelength of the communication light beam 30 is preferably set by a relative coordinate system with reference to the traveling direction of the moving body 1.

Further, in the above-described embodiment, an example is shown in which it is configured such that the light source 7 emits light within the range from blue to green (light having wavelengths within the range from about 450 nm to about 570 nm) as the communication light beam 30, but the present invention is not limited thereto. For example, the light source 7 may be configured to emit red light (light having a wavelength of about 650 nm) or purple light (light having a wavelength of about 405 nm). As long as wireless communication can be carried out in water, the communication light beam emitted by the light source 7 may be a light beam of any color (any wavelength).

Further, in the above-described embodiments, an example is shown in which it is configured such that the first moving body 1a transmits the control signal 31, but the present invention is not limited thereto. For example, the second moving body 1b may be configured to transmit the control signal 31. Each moving body 1 may be configured to be autonomously movable, and each moving body 1 may be configured to transmit a control signal 31 to another moving body 1.

Further, in the above-described embodiment, an example is shown in which the filter 9 is a band-pass filter, but the present invention is not limited thereto. As long as it can selectively transmit a light beam having a wavelength corresponding to each incident direction of the communication light beam 30, the filter 9 may have any configuration. For example, the filter 9 may be configured by combining a low-pass filter and a high-pass filter.

Further, in the above-described embodiments, an underwater optical wireless communication system 100 may not be provided with the controller 3. In a case where the underwater optical wireless communication system 100 is not provided with the controller 3, any one of the plurality of moving bodies 1 may be configured to control the other moving bodies 1.

Further, in the above-described embodiments, an example is shown in which the moving body 1 is an AUV (Autonomous Underwater Vehicle), but the present invention is not limited thereto. For example, the moving body 1 may be a manned submersible (HOV: Human Occupied Vehicle). The moving body 1 may be a remote-controlled robot (ROV: Remotely Operated Vehicle) operated by a person via a cable.

Further, in the above-described embodiments, an example is shown in which the light source 7 is a laser diode, but the present invention is not limited thereto. For example, the light source 7 may be an LED-light source. However, the optical communication using an LED light source is low in communication speed as compared with the optical communication using a laser diode. It is, therefore, preferred that light source 7 be a laser diode.

[Aspects]

It will be understood by those skilled in the art that the above-described exemplary embodiments are concrete examples of the following aspects.

(Item 1)

An underwater optical wireless communication system that performs wireless communication using light in water, the system comprising:

a plurality of moving bodies capable of moving in water, wherein the plurality of moving bodies includes an optical wireless communication unit configured to perform bidirectional communication between the plurality of moving bodies using communication light beams having wavelengths different from each other in a plurality of directions which are mutually opposite directions, and wherein the optical wireless communication unit is configured to perform bidirectional communication between the plurality of moving bodies using the communication light beams, the communication light beams having the same wavelength with respect to each of the plurality of directions, between the plurality of moving bodies.

(Item 2)

The underwater optical wireless communication system as recited in the above-described Item 1, wherein the optical wireless communication unit is provided with a light emitting unit and a light receiving unit, the light emitting unit being configured to emit communication light beams having wavelengths different from each other for each irradiation direction of the communication light beam, the light receiving units being configured to receive communication light beams having wavelengths different from each other for each incident direction of the communication light beam, wherein the light emitting unit is configured to be able to emit the communication light beams in at least a first direction and a second direction opposite to the first direction, wherein the light receiving unit is configured to be able to receive at least the communication light beam incident from the first direction and the communication light beam incident from the second direction, wherein a wavelength of the communication light beam with respect to the first direction is equal between the plurality of moving bodies, and wherein a wavelength of the communication light beam with respect to the second direction is equal between the plurality of moving bodies.

(Item 3)

The underwater optical wireless communication system as recited in the above-described Item 2, wherein the light emitting unit is provided with a plurality of light sources provided for each irradiation direction of the communication light beam and each configured to emit a communication light beam having a wavelength corresponding to the irradiation direction of the communication light beam, and wherein the light receiving unit is provided with a plurality of light receiving elements provided for each incident direction of the communication light beam and configured to receive the communication light beam having a wavelength corresponding to the incident direction of the communication light beam.

(Item 4)

The underwater optical wireless communication system as recited in the above-described Item 2, wherein the light receiving unit is provided with a filter configured to selectively transmit the communication light beam having a wavelength corresponding to each incident direction of the communication light beam.

(Item 5)

The underwater optical wireless communication system as recited in the above-described Item 1, wherein the plurality of moving bodies is configured to be able to perform direct communication between moving bodies arranged adjacently and perform communication between moving bodies not arranged adjacently by a relay system in which a plurality of moving bodies arranged between the moving bodies not arranged adjacently is served as relay devices.

(Item 6)

The underwater optical wireless communication system as recited in the above-described Item 5, further comprising:

a controller configured to control the plurality of moving bodies, wherein the controller is configured to perform control to transmit a control signal and transmit the transmitted control signal by the relay method in the plurality of moving bodies.

(Item 7)

An underwater optical wireless communication method using light in water, comprising the steps of:

emitting communication light beams, the communication light beams having wavelengths different from each other for each irradiation direction in a plurality of directions opposite to each other, the communication light beams being the same in a wavelength with respect to each irradiation direction in the plurality of directions, between the plurality of moving bodies; and receiving the communication light beams, the communication light beams having wavelengths different from each other for each incident direction, the communication light beams being the same in a wavelength with respect to each incident direction in the plurality of directions between the plurality of moving bodies.

(Item 8)

An underwater moving body for performing wireless communication using light in water, the underwater moving body comprising:

a light emitting unit configured to emit communication light beams having wavelengths different from each other for each irradiation direction; and a light receiving unit configured to receive the communication light beams having wavelengths different from each other for each incident direction of the communication light beam, wherein the underwater moving body is configured to be able to perform bidirectional communication with other moving bodies.

DESCRIPTION OF SYMBOLS

1: Moving body (underwater moving body)
2: Optical wireless communication unit
3: Controller 6: Light receiving unit
7: Light source unit
8: Light receiving element
9: Filter
30: Communication light beam
31: Control signal
100: Underwater optical wireless communication system

The invention claimed is:

1. An underwater optical wireless communication system that performs wireless communication using light in water, the system comprising:
   a plurality of moving bodies capable of moving in water,
   wherein the plurality of moving bodies each includes an optical wireless communication unit configured to perform bidirectional communication between the plurality of moving bodies using communication light beams having wavelengths different from each other for each irradiation direction in a plurality of directions which are mutually opposite directions, and
   wherein the optical wireless communication unit is configured to perform bidirectional communication by emitting the communication light beams having the same wavelength with respect to each of the plurality of directions and receiving the communication light beams having wavelengths different from wavelengths of the emitted communication light beams between the plurality of moving bodies arranged adjacently.

2. The underwater optical wireless communication system as recited in claim 1,
   wherein the optical wireless communication unit is provided with a light emitting unit and a light receiving unit, the light emitting unit being configured to emit communication light beams having wavelengths different from each other for each irradiation direction of the communication light beam, the light receiving units being configured to receive communication light beams having wavelengths different from each other for each incident direction of the communication light beam,
   wherein the light emitting unit is configured to be able to emit the communication light beams in at least a first direction and a second direction opposite to the first direction,
   wherein the light receiving unit is configured to be able to receive at least the communication light beam incident from the first direction and the communication light beam incident from the second direction,
   wherein a wavelength of the communication light beam with respect to the first direction is equal between the plurality of moving bodies, and
   wherein a wavelength of the communication light beam with respect to the second direction is equal between the plurality of moving bodies.

3. The underwater optical wireless communication system as recited in claim 2,
   wherein the light emitting unit is provided with a plurality of light sources provided for each irradiation direction of the communication light beam and each configured to emit a communication light beam having a wavelength corresponding to the irradiation direction of the communication light beam, and
   wherein the light receiving unit is provided with a plurality of light receiving elements provided for each incident direction of the communication light beam and configured to receive the communication light beam having a wavelength corresponding to the incident direction of the communication light beam.

4. The underwater optical wireless communication system as recited in claim 2,
   wherein the light receiving unit is provided with a filter configured to selectively transmit the communication light beam having a wavelength corresponding to each incident direction of the communication light beam.

5. The underwater optical wireless communication system as recited in claim 1,
   wherein the plurality of moving bodies is configured to be able to perform direct communication between moving bodies arranged adjacently and perform communication between moving bodies not arranged adjacently by a relay system in which a plurality of moving bodies arranged between the moving bodies not arranged adjacently is served as relay devices.

6. The underwater optical wireless communication system as recited in claim 5, further comprising:
   a controller configured to control the plurality of moving bodies,
   wherein the controller is configured to perform control to transmit a control signal and transmit the transmitted control signal by the relay method in the plurality of moving bodies.

7. An underwater wireless communication method using light in water, comprising the steps of:
   emitting communication light beams, the communication light beams having wavelengths different from each other for each irradiation direction in a plurality of directions opposite to each other, the communication light beams being the same in a wavelength with respect to each irradiation direction in the plurality of directions, between the plurality of moving bodies arranged adjacently; and
   receiving the communication light beams, the communication light beams having wavelengths different from each other for each incident direction, the communication light beams being the same in a wavelength with respect to each incident direction in the plurality of directions and different in a wavelength from the communication light beam emitted in the step of emitting the communication light beam, between the plurality of moving bodies arranged adjacently.

8. An underwater moving body to be provided in an underwater wireless communication system that performs wireless communication using light in water, the underwater moving body comprising:
   a light emitting unit configured to emit communication light beams having wavelengths different from each other for each irradiation direction; and
   a light receiving unit configured to receive the communication light beams having wavelengths differing from each other for each incident direction of the communication light beam,
   wherein the underwater moving body is configured to be able to perform bidirectional communication between other moving bodies arranged adjacently by emitting the communication light beam having a wavelength different from a wavelength of the communication light beam emitted by the light emitting unit.

* * * * *